US008913758B2

(12) United States Patent
Levi et al.

(10) Patent No.: US 8,913,758 B2
(45) Date of Patent: Dec. 16, 2014

(54) SYSTEM AND METHOD FOR SPATIAL NOISE SUPPRESSION BASED ON PHASE INFORMATION

(75) Inventors: Avram Levi, Madison, NJ (US); Heinz Teutsch, Green Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 629 days.

(21) Appl. No.: 13/205,322

(22) Filed: Aug. 8, 2011

(65) Prior Publication Data

US 2012/0093338 A1 Apr. 19, 2012

Related U.S. Application Data

(60) Provisional application No. 61/394,194, filed on Oct. 18, 2010.

(51) Int. Cl.
*H04R 3/00* (2006.01)
*H04B 15/00* (2006.01)

(52) U.S. Cl.
CPC .......... *H04R 3/005* (2013.01); *H04R 2201/401* (2013.01); *H04R 2201/403* (2013.01); *H04R 2201/405* (2013.01); *H04R 2430/23* (2013.01)
USPC ............................ 381/92; 381/94.1; 381/94.2

(58) Field of Classification Search
USPC ............ 381/92, 74.1–74.14, 73.1, 94.1, 94.2, 381/94.7; 700/94; 704/226, 233
See application file for complete search history.

(56) References Cited

U.S. PATENT DOCUMENTS

| | | | | |
|---|---|---|---|---|
| 6,910,011 | B1 * | 6/2005 | Zakarauskas | 704/233 |
| 7,565,288 | B2 | 7/2009 | Acero et al. | |
| 2008/0260175 | A1 | 10/2008 | Elko | |
| 2009/0279715 | A1 * | 11/2009 | Jeong et al. | 381/92 |
| 2011/0046948 | A1 * | 2/2011 | Pedersen | 704/231 |

OTHER PUBLICATIONS

Gannot et al, “Signal enhancement using beamforming and nonstationarity with applications to speech”, IEEE, vol. 49, Aug. 2001, pp. 1614-1626.*

* cited by examiner

*Primary Examiner* — Paul S Kim
*Assistant Examiner* — David Ton

(57) ABSTRACT

Disclosed herein are systems, methods, and non-transitory computer-readable storage media for suppressing spatial noise based on phase information. The method transforms audio signals to frequency-domain data and identifies time-frequency points that have a parameter (e.g., signal-to-noise ratio) above a threshold. Based on these points, unwanted signals can be attenuated the desired audio source can be isolated. The method can work on a microphone array that includes two microphones or more.

20 Claims, 10 Drawing Sheets

SYSTEM AND METHOD FOR SPATIAL NOISE SUPPRESSION BASED ON PHASE INFORMATION

RELATED APPLICATIONS

This application claims priority to U.S. Provisional Application No. 61/394,194, filed 18 Oct. 2010, the contents of which are herein incorporated by reference in their entirety.

BACKGROUND

1. Technical Field

The present disclosure relates to audio signal processing and more specifically to speech isolation.

2. Introduction

The quest to extract a desired speech signal from a mixture of signals including a number of directional interferer has led to a vast body of literature that has been growing rapidly over the last four decades.

Early signal extraction methods include algorithmically relatively simple fixed beamforming techniques such as delay-and-sum beamforming (DSB), filter-and-sum beamforming (FSB), and superdirective beamforming (SDB). These methods typically only achieve low to moderate signal extraction performance, whereby better performance is proportional to the number of microphones utilized, but additional microphones can add cost and may add an impractical amount of bulk and/or weight in mobile applications. In particular, these techniques tend to fail in moderately to highly reverberant acoustic environments.

Adaptive methods, such as the generalized sidelobe canceller (GSC), can improve spatial separation performance significantly, but introduce some drawbacks. Adaptive filtering can deal with changing parameters within the acoustic space, such as moving sources. However, because adaptation cannot happen instantaneously, adaptive filters must be carefully controlled to prevent instability. Thus, adaptive filtering can require tuning to be useful for a wide range of applications.

Another more recent adaptive beamforming method is based on blind source separation (BSS) techniques. Modern implementations can very effectively extract a desired source signal from a mixture of sources. However, typically, the same number of microphones as distinct sources are required for this technique to work well. Also, these systems are algorithmically fairly complex and are based on adaptive filtering techniques that may suffer from the same disadvantages mentioned in the context of the generalized sidelobe canceller.

Spatial noise suppression based on magnitude (SNS-M) is based on as few as two microphones, is fairly effective, and algorithmically very cheap. SNS-M compares magnitude measurements of an omnidirectional and dipole component that can be derived from two closely-spaced microphones. A disadvantage of this method is that the two microphones should be, ideally, perfectly calibrated for maximum performance.

TABLE 1

| | FSB/DSB | SDB | GSC | BSS | SNS-M |
|---|---|---|---|---|---|
| Algorithm complexity | Medium | **Low** | High | High | **Low** |
| Hardware cost | High | **Low** | Medium | **Low** | **Low** |
| Effectiveness | Low | Medium | **High** | **High** | **High** |
| Robustness | **High** | Very low | Low | Medium | Medium |
| Versatility | Medium | Medium | Medium | Low | **High** |

Table 1 succinctly illustrates the strengths and weaknesses of each of these five prior art methods, and highlights favorable characteristics in bold. As can be seen, each of these approaches includes at least one weakness or are for potential improvement.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for spatial noise suppression based on phase information. The disclosed approaches have low algorithmic complexity, low hardware cost, high effectiveness, and are highly robust and versatile. The method is discussed in terms of a system configured to implement the method. The system receives, via two or more microphones, audio signals emanating from the same audio space. The audio space can be a narrow or a large area and can include one or more audio sources, any of which can be a desired or targeted audio source. The system performs a short-time Fourier transform on the received audio signals to yield frequency-domain data. In that frequency-domain data, the system identifies time-frequency points that have a parameter, such as a signal to noise ratio, above a certain threshold. This identification is based on the phase difference between the audio signals received by the two or more microphones. After the time-frequency points that have a parameter that falls below the threshold are attenuated, the system applies an inverse short-time Fourier transform to the audio signals, and based on that data, generates an output audio signal. Thus, the system isolates a desired audio source by attenuating unwanted noises.

In another aspect, the system forms a delay-and-sum beamformer with the microphones and aims the beamformer at a desired audio source that has been identified by comparing the time-frequency points against the threshold.

In yet another aspect, the system performs multiple short-time Fourier transforms in parallel in order to track concurrently more than one desired audio source and/or to identify a desired audio source from a group of audio sources.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A system, method and non-transitory computer-readable media are disclosed which suppress spatial noise based on phase information received at two or more microphones. A brief introductory description of a basic general purpose system or computing device in FIG. 1 which can be employed to practice the concepts is disclosed herein. A more detailed description of spatial noise suppression based on phase information will then follow. These variations shall be discussed herein as the various embodiments are set forth. The disclosure now turns to FIG. 1.

Figure 1:
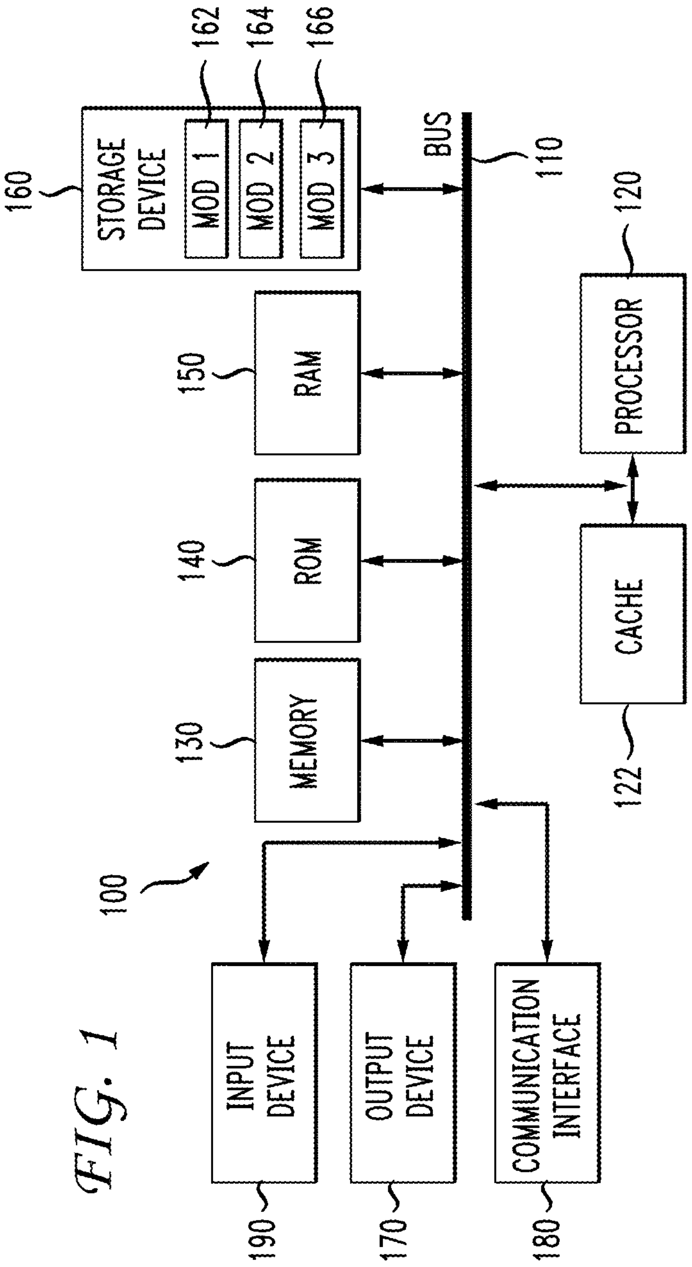
FIG. 1 illustrates an example system embodiment

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
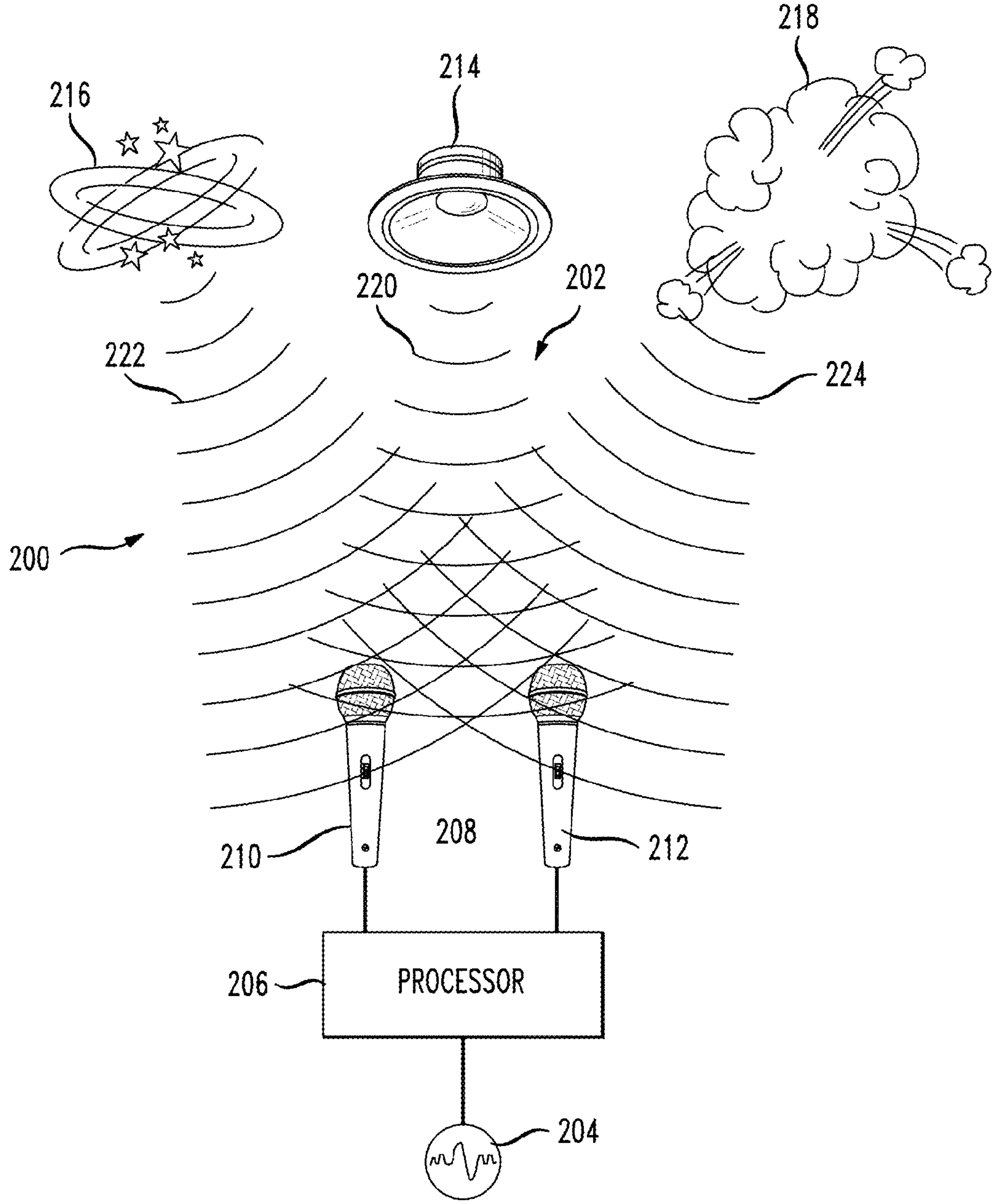
FIG. 2 illustrates an example spatial noise suppression system configuration.

Having disclosed some basic system components and concepts, the disclosure now returns to a discussion of focusing on a desired audio signal and attenuating other audio signals. Having disclosed some components of a computing system, the disclosure now turns to FIG. 2, which illustrates spatial noise suppression based on phase information. The system 200 receives audio signals from an audio space 202 and is capable of generating an output audio signal 204. The system 200 includes at least one processor 206 and a microphone array 208. The illustrated microphone array 208 includes the first microphone 210 and the second microphone 212 but the microphone array 208 is not limited to two microphones. The microphone array 208 can include three or more microphones. The microphones may be positioned in a linear configuration or in a non-linear configuration within a three-dimensional space. The distance between any two of the microphones 210, 212 in the microphone array 208 can greatly vary from a few millimeters or less to a few meters or more. The principles disclosed herein are applicable to capture of any signals that have a phase, such as capturing audio with a microphone, or capturing light with a camera, for example. The distances between any given two microphones can be uniform or non-uniform. In some circumstances, the system 200 performs better when the microphones are farther apart.

The audio space 202 is a two-dimensional or three-dimensional space, in which one or more audio sources 214, 216, 218 generate one or more audio signals 220, 222, 224. The audio space 202 can contain a desired audio source 214 and one or more interfering audio sources 216, 218 such as background noise, music, or human voices. Alternatively, the audio space 202 can include more than one desired audio source 214, such as two users interacting with a spoken natural language dialog system. A desired audio source 214 can be a human speech, music, or any other sound that the system isolates from other interfering audio sources 216, 218.

The audio signals 220, 222, 224 emanating from the various audio sources 214, 216, 218 travel in the audio space 202 to eventually reach the microphone array 208. Because of the arrangement of the microphones 210, 212 within the microphone array 208 and the interval between the microphones 210, 212, the distance that any given audio signal 220, 222, 224 may have to travel to reach a microphone may be slightly different from one microphone 210 to another microphone 212. As a result, the first microphone 210 and the second microphone 212 may pick up the identical audio signal 220 with a slight phase disparity along the time spectrum. This applies to any audio signal 220, 222, 224 in the audio space 202. For instance, the audio signal 222 emanating from the audio source 216 reaches microphone 210 first, which is situated slightly closer to the audio source 216 than microphone 212 due to the particular spatial configuration of the microphone array 208. A short time later, the audio signal 222 reaches microphone 212, which is farther away from the audio source 216. Therefore, in this instance the two microphones 210, 212 register the same audio signal, but with a slight time delay between the two, such that each signal received at microphones 210, 212 is slightly out of phase with respect to the other.

The audio signals 220, 222, 224 received by the microphone array 208 are in turn transmitted to the processor 206, which performs various signal processing steps on the signals as discussed in detail below, in order to suppress or attenuate undesired noises. As a result, the processor 206 generates an output audio signal 204. The output audio signal 204 can correspond to a region in the audio space 202.

Figure 3A:
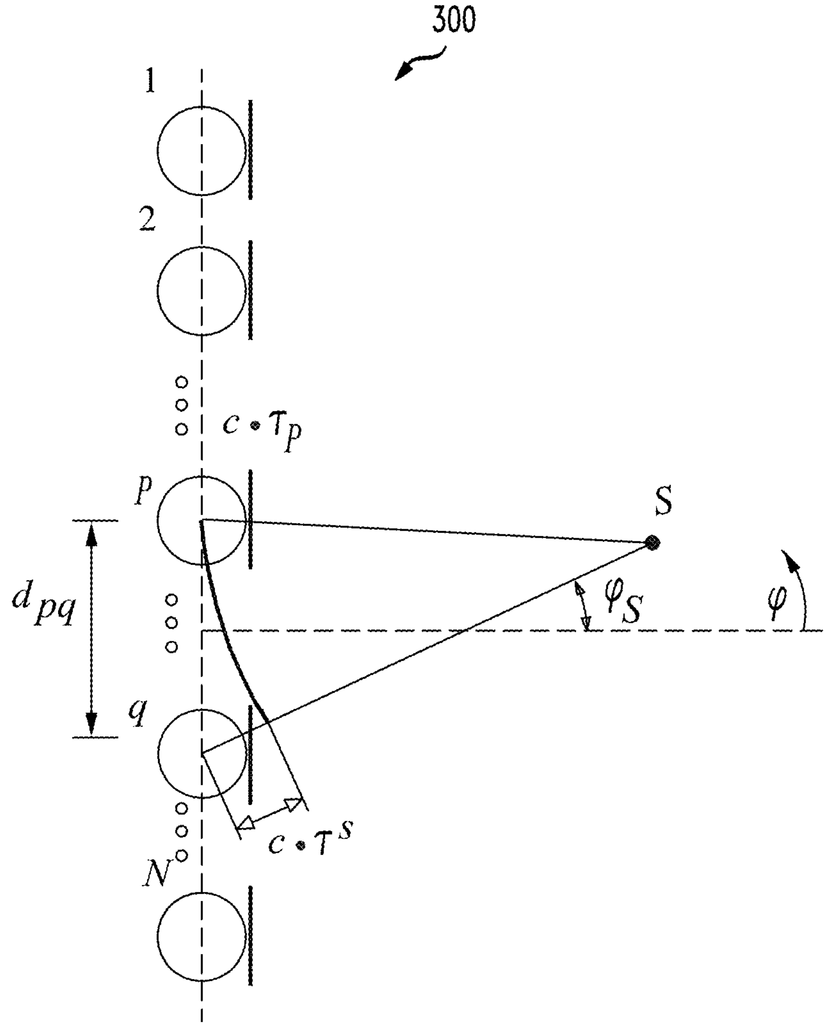
FIGS. 3A and 3B illustrate example microphone configurations and audio source placements.
Figure 3B:
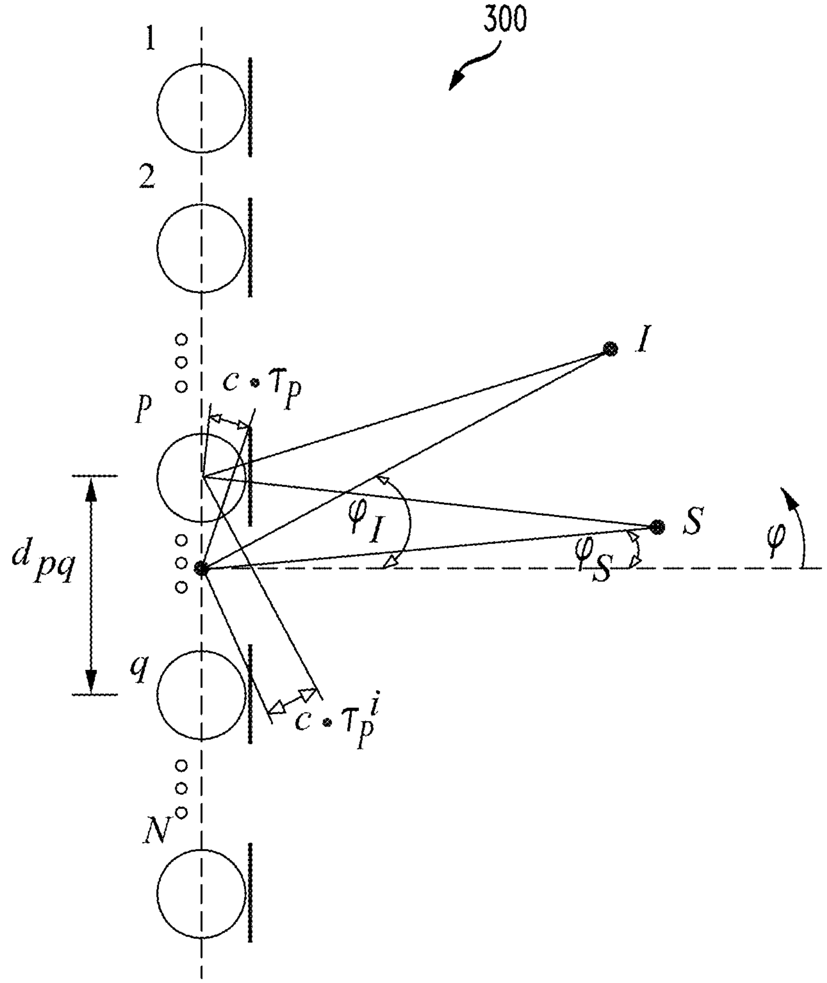

FIGS. 3A and 3B illustrate example microphone configurations and audio source placements (300), (302). In these exemplary configurations, N microphones are arranged in a linear fashion, but the arrangement can be non-linear and the microphones can be placed in a three-dimensional space so that not all of the microphones exist on the same plane. FIG. 3A illustrates a single desired audio source S, and FIG. 3B illustrates a desired audio source S and an interfering audio source I.

Based on the farfield assumption that a signal recorded by microphone p is identical to the signal recorded by microphone q minus a time-delay, an exemplary desired source S at a remote location from the microphones p and q emits a signal a(t). Then, the signal captured by microphone q is a time-delayed version of the signal captured by microphone p. The time-delay is denoted as $\tau^S$ and the additional distance traveled is $c\cdot\tau^S$, where c is the speed of sound. The time-delay can take in to account a given medium through which the signal a(t) travels, typically air. The same holds true for an interferer I emitting a signal i(t).

Assuming free-field conditions—meaning that there are no appreciable effects on sound propagation from obstacles, boundaries, or reflecting surfaces—the signal recorded at microphone p can be represented as $y_p(t)=a(t-\tau_p)+i(t-\tau^i_p)$. An interferer I can be any audio source that generates unwanted sounds, including a human speaker, music, traffic noise, rotating fan noise, engine noise, ambient noise, echoes of the desired audio source, etc.

In one aspect, the system forms a basic delay-and-sum beamformer, aims the beamformer at the desired talker, and takes the short-time Fourier transform of the beamformer output. Then the system can examine the generated frequency-domain data and identify time-frequency points with high signal-to-interference ratio (SIR), retain these time-frequency points and attenuate all others. The system can reconstruct the signal by applying an inverse Fourier transform.

Time-alignment at microphone p can be obtained as $$\begin{aligned} y_p^S(t) &= y_p(t+\tau_p) \\ &= a(t) + i(t-\tau_p^i+\tau_p) \\ &= a(t) + i(t+\tau_p^S), \end{aligned}$$

where $\tau_p^S \equiv \tau_p - \tau_p^i$. Transforming the time-aligned output of microphone p into the frequency domain gives $$Y_p^S(\omega) = A(\omega) + I(\omega)e^{-j\omega\tau_p^S},$$

where $j^2=-1$. In the frequency-domain, the SIR is defined as $$SIR(\omega) = \frac{|A(\omega)|}{|I(\omega)|}.$$

Taking the cross power spectrum between microphones p and q yields $$\Psi_{pq}^S(\omega) = Y_p^S(\omega) \cdot Y_p^S(\omega)^*,$$

where the superscript '*' denotes the conjugate complex operator. If the SIR is very large, i.e., SIR(ω)>>1, then $$\Psi_{pq}^S(\omega) \approx |A(\omega)|^2,$$

which means that the phase of $\Psi_{pq}^S(\omega)$ is approximately zero. In the other extreme, where the SIR is very low, i.e., SIR(ω)<<1, then $$\Psi_{pq}^S(\omega) \approx I(\omega)e^{-j\omega\tau_p^S} I(\omega)^* e^{j\omega\tau_q^S} = |I(\omega)|^2 e^{j\omega(\tau_q^S - \tau_p^S)}.$$

In one embodiment, a classification measure can be defined as $$\gamma_{pq}^S(\omega) = \frac{1}{2}\left[\frac{\Psi_{pq}^S(\omega) + (\Psi_{pq}^S(\omega))^*}{|\Psi_{pq}^2(\omega)|}\right].$$

With this exemplary classification measure, it follows that for SIR(ω)>>1

$$\gamma_{pq}^S(\omega) = 1,$$

And for SIR(ω)<<1

$$\gamma_{pq}^S(\omega) = \cos\left[\omega(\tau_q^S - \tau_p^S)\right].$$

In other words, for frequency components where only the desired source is active, i.e., SIR(ω)>>1, the classification measure returns unity while the classification measure returns a cosine function modulated by the time delay difference between the microphone pair (p, q).

Figure 4A:
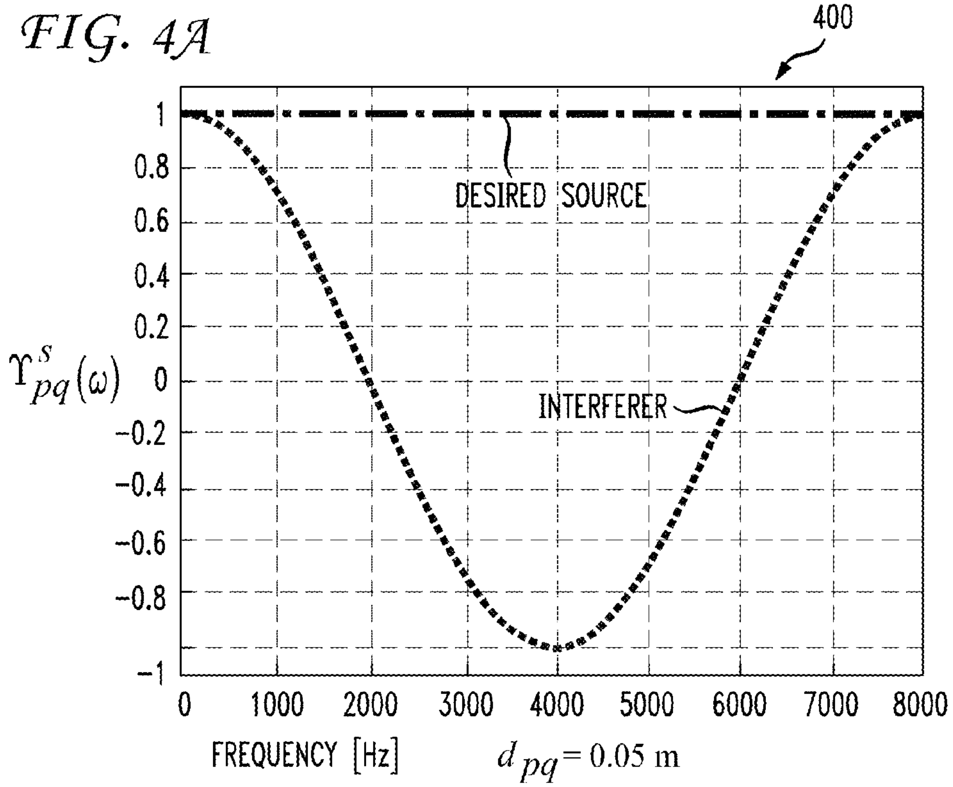
FIG. 4A is a first graph illustrating an example interferer classification measure for a short-interval two-microphone array.
Figure 4B:
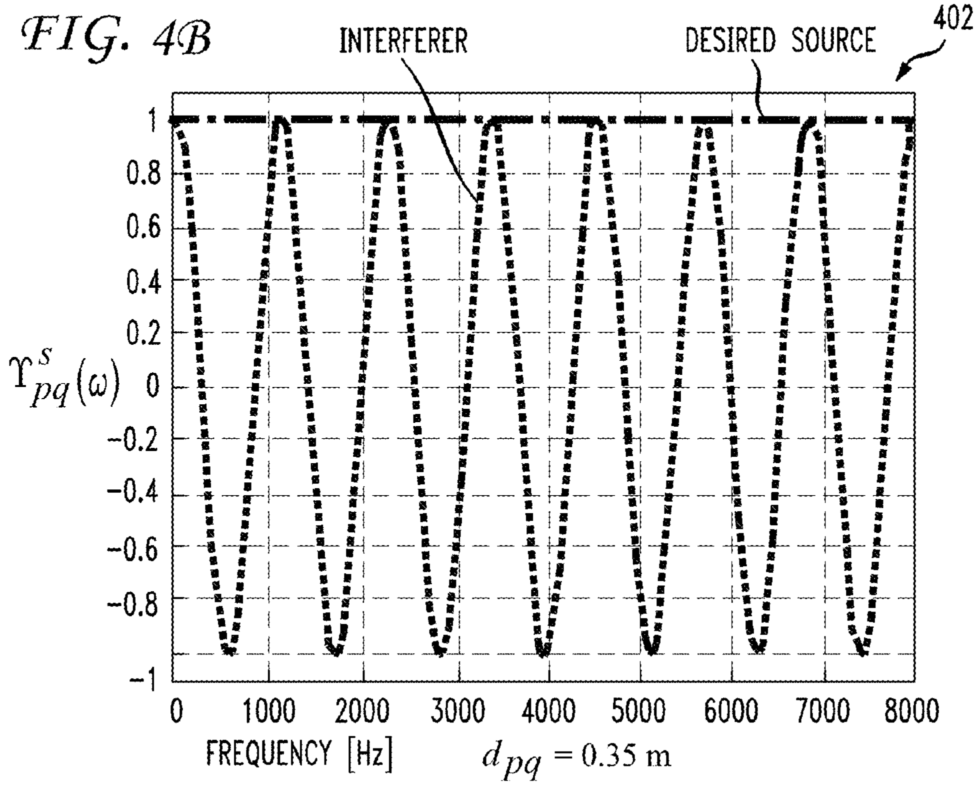
FIG. 4B is a second graph illustrating an example interferer classification measure for a longer-interval two-microphone array.

As an example, FIGS. 4A and 4B illustrate a theoretical source classification measure, $\gamma_{pq}^S(\omega)$, for N=2, $d_{pq}$={0.05, 0.35} m, $\phi_S=0$, $\phi_I=\pi/3$, and $f_S$=16 kHz, where $f_S$ denotes the sampling frequency. These and other numbers suggested in the figures as well as the classification measure $\gamma_{pq}^S(\omega)$ itself are merely exemplary. Other classification measures can be used to isolate frequency-domain data points that are associated with the desired source.

As shown in FIG. 4A, where $d_{pq}$=0.05 m, discrimination between desired signal and interferer is virtually impossible for low and high frequency bands. This is shown on the left and right edges of the FIG. 4A, where the line representing the interferer approaches the line representing the desired audio source.

FIG. 4B illustrates a classification measure used with a larger microphone spacing, where $d_{pq}$=0.35 m. Without further audio processing, signal discrimination would be more difficult compared to FIG. 4A, where $d_{pq}$=0.05 m. However, by considering the wideband properties of speech, which is a common source for desired and interfering signals in typical applications considered for this technology, the following exemplary averaging technique can be applied to FIG. 4B. A sufficiently wide frequency-window is moved through the data represented by FIG. 4B and the minimum is used as the new $\gamma_{pq}^S(\omega)$ for every ω in that window. The width of the window is preferably on the order of 1500 Hz but can be of a different size.

Figure 4C:
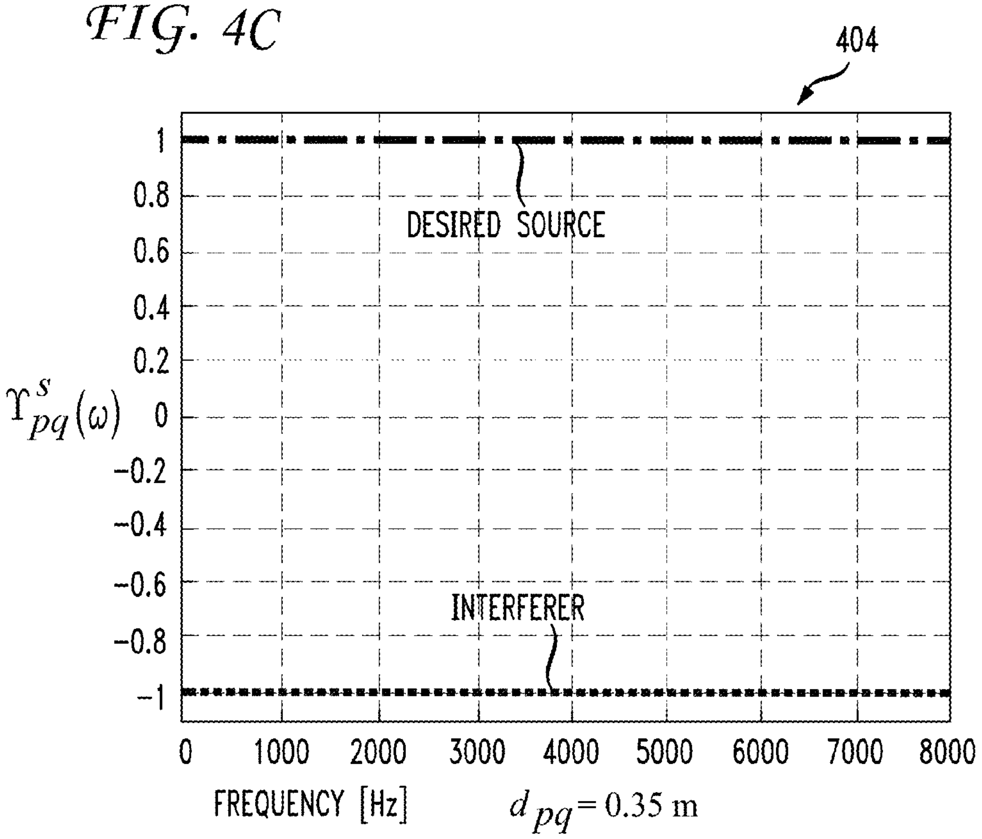
FIG. 4C is a third graph illustrating an example modified interferer classification measure for a longer-interval two-microphone array.

FIG. 4C illustrates an exemplary modified interferer classification measure 404 as a result of the transformation that takes place after such window function is applied. Such transformation can make discrimination possible for all frequencies. To arrive at a differentiation decision, a threshold $\bar{\gamma}_{pq}^S$ can be introduced and all time-frequency points that lie below this threshold can be attenuated by a factor G. The beamformer output, or the Fourier transform, is then modified as $$\hat{Y}^s(\omega) = \begin{cases} Y^S(\omega)/G, & \gamma_{pq}^S(\omega) < \bar{\gamma}_{pq}^S \\ Y^S(\omega), & \text{else.} \end{cases}$$

Figure 5A:
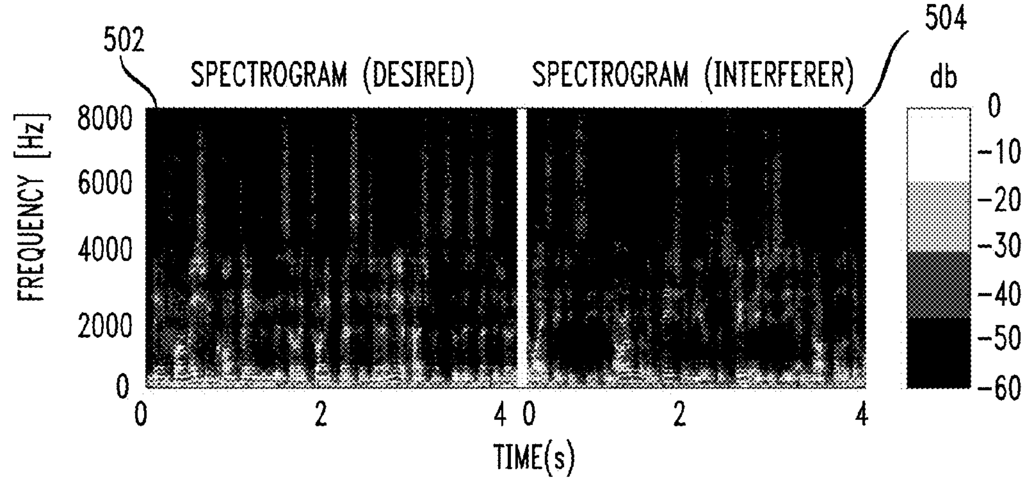
FIG. 5A illustrates example spectrograms for unprocessed frequency-domain data.

FIGS. 5A-5E show example spectrograms and classification measure at various stages of audio signal processing that illustrate these concepts. For example, FIG. 5A shows spectrograms of frequency-domain data for a desired source 502 and an interferer 504. Both the desired source 502 and the interferer 504 can be any one of the following: a human speech, music, ambient noise, or other sound.

Figure 5B:
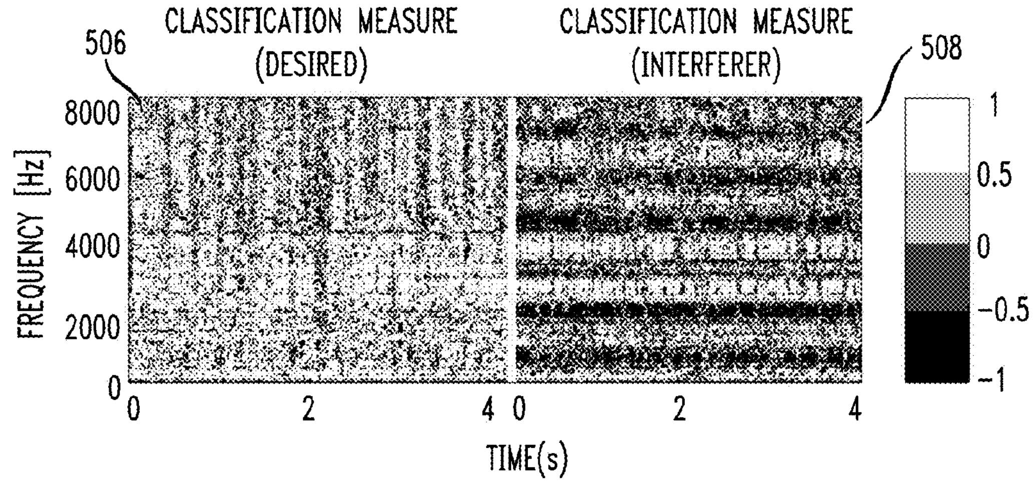
FIG. 5B illustrates an example classification for unprocessed frequency-domain data.

FIG. 5B illustrates an example classification measure for unprocessed data. The exemplary figure represents a surface plot of a classification measure, such as $\gamma_{pq}^S(\omega)$, for the desired source (506) and the surface plot of a classification measure for the interferer (508), and they are equivalents of the source classification measure data before processing (402), illustrated in FIG. 4B, but represented on a continuous time spectrum. The frequency-domain data can correspond to various regions in a given audio space. The surface plot of the classification measure for the desired source (506) can contain all or mostly ones (shown in light) when the audio source is active, while the surface plot of the classification measure for the interferer (508) can represent a cosine function (shown in undulation of light and dark). The phase measurements at this stage can be noisy and may need further processing in order to arrive at a reliable classification measure.

Figure 5C:
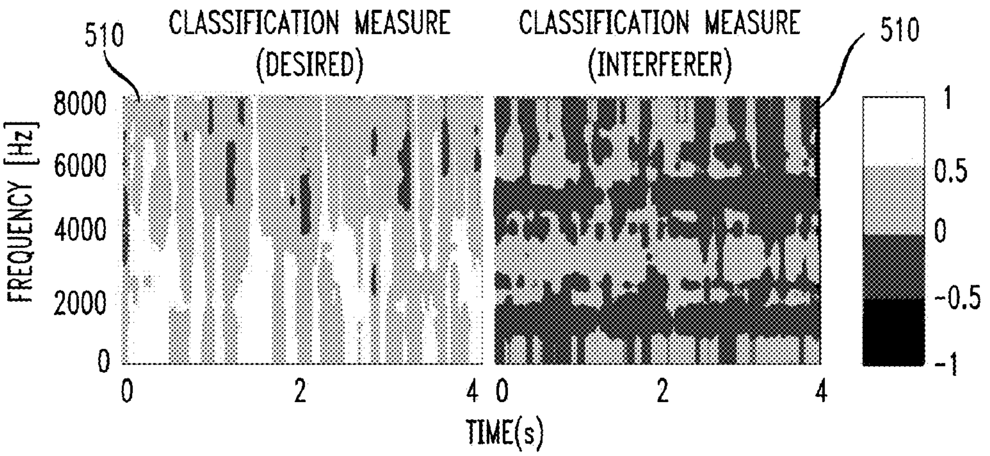
FIG. 5C illustrates an example classification for post-processed frequency-domain data.

FIG. 5C illustrates example post-processing steps introduced to make the discrimination method more robust by smoothing the $\gamma_{pq}^S(\omega)$ surface. The resultant exemplary classifications for the desired source 510 and the interferer 510 are shown. One such post-processing smoothing method is to apply a two-dimensional averaging filter (for example, 40 ms in time and 1500 Hz in frequency). Another such method is to apply a sliding window averaging technique by sweeping a sufficiently wide frequency window (on the order of 1500 Hz, for example) through the frequency-domain data represented by FIG. 5B and using the minimum as the new $\gamma_{pq}^S(\omega)$ for every ω in that window. Yet other means of data-smoothing may be contemplated, or any combination of two or more of the above illustrated methods can be used to arrive at a more robust classification measure. After such post-processing steps, the classification measure 510 should resemble the actual spectrogram 502 more closely, thereby facilitating more accurate discrimination between desired source 502 and interferer 504.

Figure 5D:
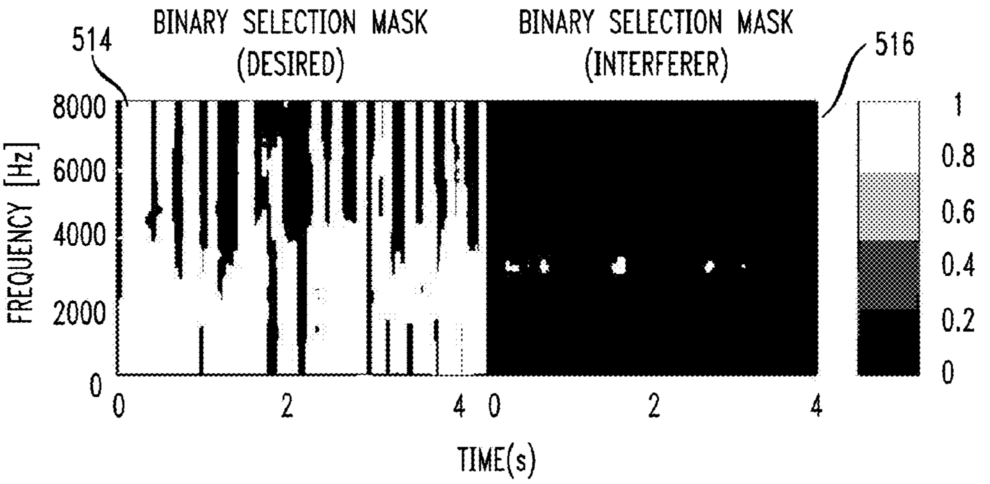
FIG. 5D illustrates example binary selection masks for post-processed frequency-domain data.

FIG. 5D illustrates example binary selection masks for post-processed data. The system can devise binary selection masks by using the threshold $\bar{\gamma}_{pq}^{S}$ as explained above. For the exemplary classification measure, $\gamma_{pq}^{S}(\omega)$, the threshold can lie somewhere between −1 and 1. The threshold can be preset or dynamically adjusted to obtain the optimal level of noise isolation. The system uses the binary selection masks that are capable of reliably distinguishing between desired source and interferer to designate relevant time-frequency points that need to be filtered out or kept intact. The mask can suppress the interferer by, for instance, a factor G.

Figure 5E:
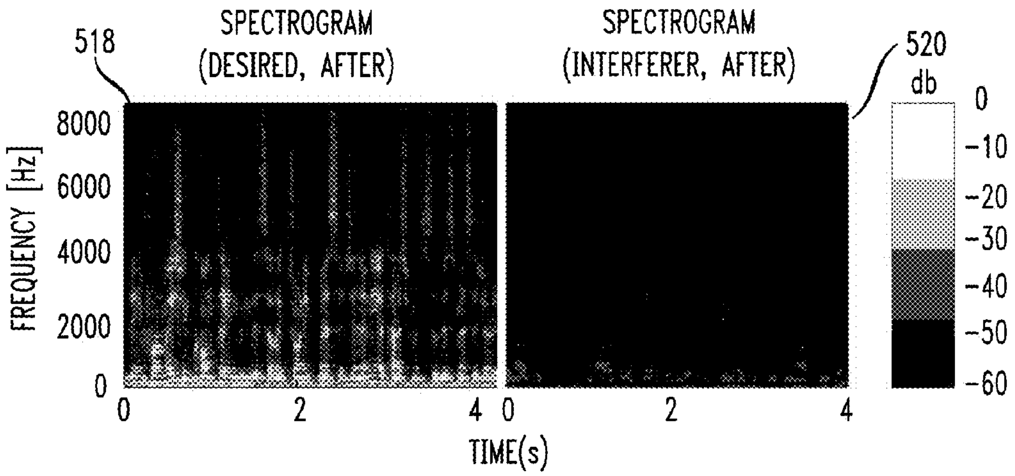
FIG. 5E illustrates example spectrograms for post-processed frequency-domain data.

FIG. 5E illustrates example spectrograms of the desired source 514 and interferer 516 after processing. The spectrograms 514, 516 show that the signal of the desired source can be retained almost unmodified while the signal of the interferer is almost completely eliminated.

The technique illustrated above can be used in a similar manner when there are more than two microphones in the microphone array 208. The algorithm works for any N≥2, where N represents the number of microphones used. For N>2 the classification measure, such as $\gamma_{pq}^{S}(w)$, has to be calculated for all distinct microphone pairs (p, q) within the array and then combined (by means of averaging, for example) to arrive at an overall classification measure. Optionally, as a compensation measure when a desired source moves too far from the microphone array's "look direction", thereby causing the system to treat the desired source more and more like an interferer and thereby attenuated, the system can steer the array to not only the known/assumed location but also to adjacent locations (±10°, for example). In one embodiment, such tolerance level for "look direction" can be either preset by manufacturer or dynamically adjusted on the fly. In another embodiment, a user can directly or indirectly influence the level of tolerance. In such cases, the system can calculate the classification measure for those modified "look directions" and combine them with the original one to obtain a wider-range spatial suppression algorithm.

Figure 6:
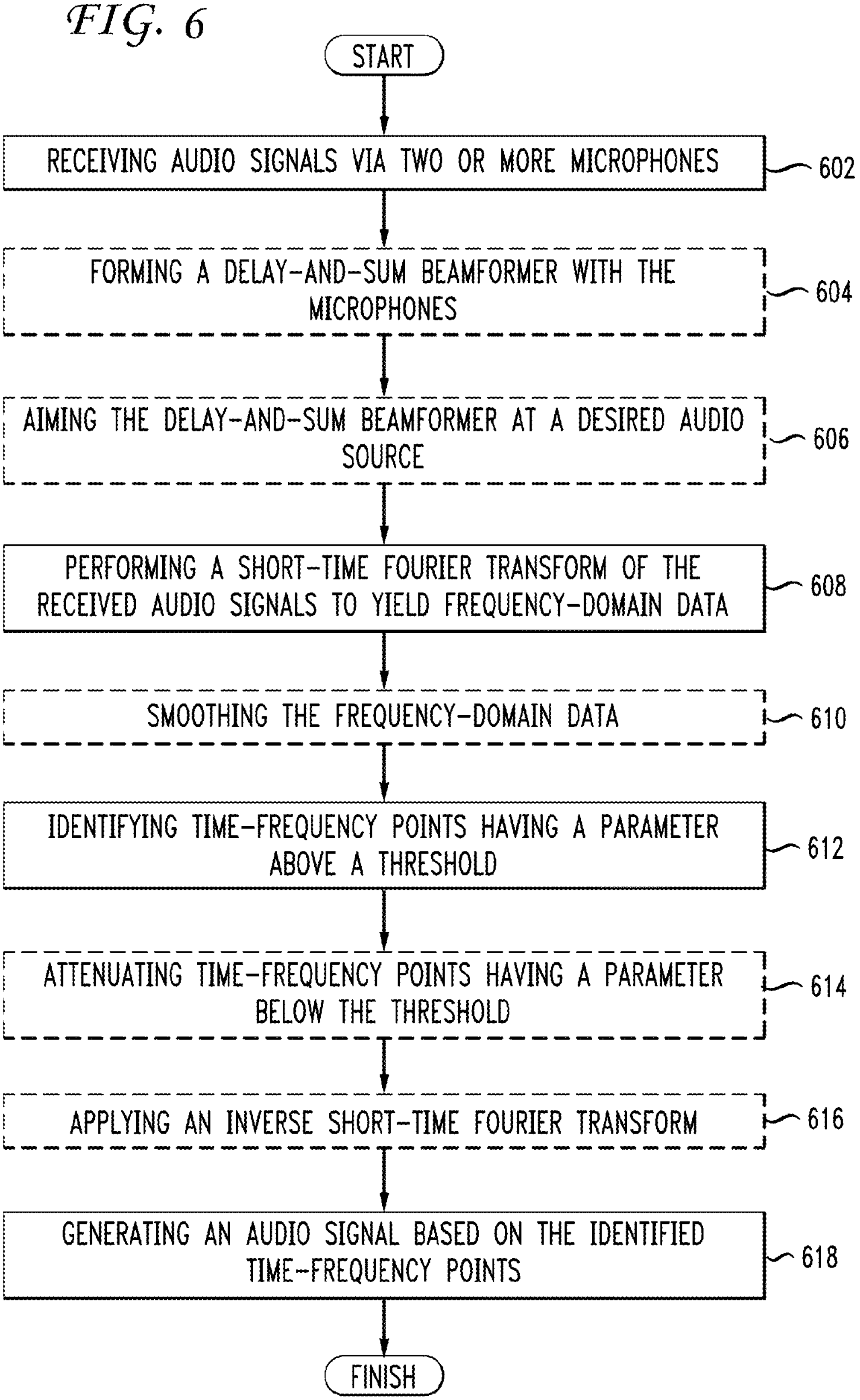
FIG. 6 illustrates an example method embodiment.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 receives audio signals via two or more microphones (602), optionally forms a delay-and-sum beamformer with the microphones (604), and further optionally aims the delay-and-sum beamformer at a desired audio source (606). Then the system 100 performs a short-time Fourier transform of the received audio signals to yield frequency-domain data (608) and optionally smoothes the frequency-domain data (610).

The system 100 identifies time-frequency points having a parameter above a threshold (612) and can optionally attenuate time-frequency points having a parameter below the threshold (614). The system 100 then optionally applies an inverse short-time Fourier transform (616) and generates an audio signal based on the identified time-frequency points (618). The audio signal attenuates unwanted signals, leaving only audio signals from a desired source or from audio sources in a desired or target audio space.

An example will illustrate the method set forth above. Assume that a user is using a speakerphone feature on her telecommunication device. Assume that she sits three feet away from the device in her open office and talks naturally to the device while two of her coworkers are having an unrelated conversation with each other in the background. The system 100 can then use phase information to locate the speaker's position in relation to the position of the microphone array in the telecommunication device. The system drowns out or attenuates other unwanted noises including the coworkers' conversation in the background in order to isolate the desired audio signals (i.e., the user's speech). If there are multiple users joining in on her conversation via the same telecommunication device, as in a conference call setting, the device can employ multiple instances of the method in parallel to track multiple speakers at the same time. When one of the participants gets up and walks around in the office, the device can continue to track the speaker without having to disengage itself from the task or having to recalibrate itself.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein other than the example embodiments and applications illustrated and described herein, and without departing from the spirit and scope of the disclosure.

We claim:

1. A method comprising:

receiving a first audio signal via a first microphone, and a second audio signal via a second microphone;

performing a short-time Fourier transform of the first audio signal and the second audio signal to yield frequency-domain data;

identifying, in the frequency-domain data and based on a first phase of the first audio signal and a second phase of the second audio signal, time-frequency points having a parameter above a threshold; and generating an audio signal based on the time-frequency points.

2. The method of claim 1, wherein generating the audio signal further comprises applying an inverse short-time Fourier transform.

3. The method of claim 1, wherein generating the audio signal further comprises attenuating time-frequency points having a parameter below the threshold.

4. The method of claim 1, wherein the first audio signal and the second audio signal each represent part of an audio space at a same time.

5. The method of claim 4, wherein the audio space is one of a two-dimensional audio space or a three-dimensional audio space.

6. The method of claim 4, wherein the audio space comprises a plurality of audio sources, and wherein one of the plurality of audio sources is a desired audio source.

7. The method of claim 1, further comprising receiving a third audio signal, wherein the short-time Fourier transform incorporates the third audio signal.

8. The method of claim 1, further comprising:

forming a delay-and-sum beamformer with the first microphone and the second microphone; and aiming the delay-and-sum beamformer at a desired audio source.

9. The method of claim 8, wherein forming the delay-and-sum beamformer further comprises time-aligning the first microphone and the second microphone such that, when the first audio signal and the second audio signal are added, the desired audio source is added coherently and other audio sources are added incoherently.

10. The method of claim 1, wherein identifying the time-frequency points further comprises smoothing the frequency-domain data.

11. The method of claim 10, wherein smoothing the frequency-domain data further comprises applying a time-frequency averaging filter.

12. The method of claim 10, wherein smoothing the frequency-domain data further comprises applying a sliding frequency window and identifying a minimum value in the sliding frequency window.

13. The method of claim 1, wherein the first audio signal and the second audio signal are from an audio space comprising a plurality of separate audio sources, and wherein performing the short-time Fourier transform occurs in parallel for each of the plurality of separate audio sources.

14. The method of claim 1, wherein the parameter is a signal-to-noise ratio.

15. A system comprising:

a processor;

a first microphone;

a second microphone; and a computer-readable storage medium storing instructions which, when executed by the processor, cause the processor to perform operations comprising:

receiving a first audio signal via the first microphone, and a second audio signal via the second microphone, wherein the first audio signal and the second audio signal originate from an audio space comprising a plurality of regions;

performing a short-time Fourier transform of the first audio signal and the second audio signal for each of the plurality of regions to yield scanned frequency-domain data;

identifying, in the scanned frequency-domain data and based on a first phase of the first audio signal and a second phase of the second audio signal, a time-frequency point having a highest signal-to-noise ratio; and marking a region in the audio space corresponding to the time-frequency point having the highest signal-to-noise ratio as a desired audio source.

16. The system of claim 15, wherein the computer-readable storage medium stores additional instructions which, when executed by the processor, cause the processor to perform further operations comprising:

generating a reconstructed audio signal of the desired audio source from the first audio signal and the second audio signal based on the time-frequency point.

17. The system of claim 15, wherein the time-frequency point has the highest signal-to-noise ratio for a desired audio signal type.

18. A computer-readable storage device storing instructions which, when executed by a processor, cause the processor to perform operations comprising:

forming a delay-and-sum beamformer using a first microphone and a second microphone;

aiming the delay-and-sum beamformer at an audio source to receive a first audio signal via the first microphone, and a second audio signal via the second microphone, wherein the first audio signal and the second audio signal are from the audio source, to yield a short-time Fourier transform of the first audio signal and the second audio signal;

generating frequency-domain data based on the short-time Fourier transform;

identifying, in the frequency-domain data and based on a first phase of the first audio signal and a second phase of the second audio signal, time-frequency points having a signal-to-noise ratio above a threshold for the audio source; and isolating a desired audio signal of the audio source by retaining the time-frequency points and attenuating all other time-frequency points in the frequency-domain data.

19. The computer-readable storage device of claim 18, wherein aiming the delay-and-sum beamformer further comprises steering the delay-and-sum beamformer to a location adjacent to the audio source, whereby a wider-range spatial suppression is achieved.

20. The computer-readable storage device of claim 18, wherein forming the delay-and-sum beamformer further comprises time-aligning the first microphone and the second microphone such that, when the first audio signal and the second audio signal are added, the audio source is added coherently and other audio sources are added incoherently.

* * * * *